No. 760,561. Patented May 24, 1904.

UNITED STATES PATENT OFFICE.

HEINRICH PAUL RUDOLF LUDWIG PÖRSCKE AND GUSTAV ADOLPH WEDEKIND, OF HAMBURG, GERMANY.

PROCESS OF MANUFACTURING HARD POROUS ELECTRODES FOR BATTERIES.

SPECIFICATION forming part of Letters Patent No. 760,561, dated May 24, 1904.

Application filed November 18, 1903. Serial No. 181,639. (No specimens.)

*To all whom it may concern:*

Be it known that we, HEINRICH PAUL RUDOLF LUDWIG PÖRSCKE and GUSTAV ADOLPH WEDEKIND, of Hamburg, Germany, have invented certain new and useful improvements in processes of treating metallic oxids or metallic powders in such a manner that they can be used for the manufacture of hard porous electrodes which do not dissolve in alkaline solutions, of which the following is a full, clear, and exact description.

The process usually adopted for rendering metallic oxids durable consists in either mixing them with sulfuric acid and allowing the resulting pulpy mass to harden or in adding muriatic acid to a mixture of metallic oxids and carbon and allowing that mixture to become firm.

Another method consists in mixing oxid of copper with chlorid of magnesium and allowing the mixture to harden.

Oxid plates made in accordance with the first-mentioned process—that is, hardened by the use of sulfuric acid—suffer from the disadvantage of being soluble in water and in alkaline solutions. Consequently they cannot be used if an alkaline solution is the electrolyte employed. The electrode made in the second manner (mixing metallic oxids with carbon and hardening the mixture by adding muriatic acid) is discharged when dipped into the electrolyte. This is due to the circumstance that there exists a potential difference between the particles of carbon and the metallic oxid employed—for instance, oxid of copper—which potential difference tends to compensate. Further disadvantages resulting from the employment of this method are that the admixture of non-depolarizing carbon unnecessarily increases the weight of the electrode and that the mass of oxid which has been mixed with carbon and then hardened becomes loose as soon as the oxid has been reduced to metal.

The third method (mixing the metallic oxid—for instance, oxid of copper—with chlorid of magnesium) cannot be employed, because oxid-of-copper electrodes which have been hardened by means of chlorid of magnesium when reduced to metal in an alkaline electrolyte gradually crumble away or gradually peel off from the carrier employed. Consequently each additional discharge after oxidation has taken place results in decreasing the capacity. Moreover, the crumbling away or peeling off of the mass of oxid very easily results in short-cuiting between electrodes of different polarity.

The process which forms the subject of the present invention consists in hardening pure metallic oxids or pure metallic powders to which no foreign additions whatever have been made by means of chlorin compounds of whatever metal is used. Oxid of copper and finely-pulverized copper are very suitable substances to employ. By mixing them with a solution of protochlorid of copper they can be hardened to a firm porous electrically-conducting substance.

To give an example, oxid of copper is stirred to a fairly consistent paste in a solution of protochlorid of copper and fine copper filings or shavings stirred into the paste, when cuprous chlorids will be formed. This paste is put into the molds, or if it is to be used for the manufacture of electrodes on suitable carriers or on copper plates then the molds, carriers, or plates are heated for about half an hour to about 100° Celsius. After that time all the water in the paste will have evaporated and the paste will have become a firm porous mass of metallic oxid. When this is done, the plate is electrolyzed with the object of setting free the oxygen and the chlorin. This can be done either by using it as a cathode or by reducing it to metal in a suitable electrolyte with a metal plate occupying a higher position in the corresponding contact series than the particular oxid plate employed and after this reoxidized in the well-known manner by heat or electrolysis.

An electrode made in accordance with this process by means of chlorid of copper does not dissolve in water or in alkaline solutions. It does not discharge automatically and does not lose in bulk even after innumerable reductions and oxidations have taken place. On the contrary, the capacity and the potential of the electrode after each discharge following oxidation remains the same as it was before the discharge. Experiments have shown that the mass remains firm and porous. Consequently an electrode made in accordance with this process can be used for a practically unlimited period. This cannot be said of any electrode made by any other known process, all such electrodes losing effective mass, and therefore capacity, even during the first reduction.

Having now described our invention, what we claim, and desire to secure by Letters Patent, is—

A process for treating metallic oxids or metallic powders of the character set forth, for the manufacture of hard porous electrodes which do not dissolve in alkaline solutions, which consists in stirring the metallic oxids or the metallic powders, without the addition of foreign substances, to a pasty mass in a solution of the chlorid of the metal used, such as a solution of protochlorid of copper to which copper-filings may be added; then putting the paste into molds or on carriers and heating until dry; then reducing the electrode to a metal in an alkaline solution until all the bound chlorin is set free whereupon the substance is again oxidized in a well-known manner by heating or electrolysis.

HEINRICH PAUL RUDOLF LUDWIG PÖRSCKE.
GUSTAV ADOLPH WEDEKIND.

Witnesses:
  H. C. HELLMRICH,
  T. CHRIST. HAFERMANN.